(12) United States Patent
Spero et al.

(10) Patent No.: US 9,572,109 B2
(45) Date of Patent: Feb. 14, 2017

(54) REDUCED POWER CONSUMPTION IN A WIRELESS NETWORK DEVICE

(71) Applicant: Silicon Laboratories Inc., Austin, TX (US)

(72) Inventors: Perry J. Spero, Melrose, MA (US); Haley April Taylor, Boulder, CO (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/661,507

(22) Filed: Mar. 18, 2015

(65) Prior Publication Data

US 2015/0195785 A1    Jul. 9, 2015

Related U.S. Application Data

(62) Division of application No. 13/279,402, filed on Oct. 24, 2011, now Pat. No. 9,088,948.

(60) Provisional application No. 61/407,131, filed on Oct. 27, 2010.

(51) Int. Cl.
*H04W 52/02* (2009.01)

(52) U.S. Cl.
CPC ..... *H04W 52/0229* (2013.01); *H04W 52/0225* (2013.01); *Y02B 60/50* (2013.01)

(58) Field of Classification Search
CPC ................. H04W 52/0229; H04W 52/0238
See application file for complete search history.

(56) References Cited

U.S. PATENT DOCUMENTS

| | | |
|---|---|---|
| 7,020,501 B1 | 3/2006 | Elliott et al. |
| 7,339,910 B2 | 3/2008 | Spencer et al. |
| 9,088,948 B2 | 7/2015 | Spero et al. |
| 2002/0025780 A1 | 2/2002 | Jakobsson et al. |
| 2004/0170194 A1 | 9/2004 | Moreton |
| 2005/0129009 A1 | 6/2005 | Kitchin |
| 2006/0029011 A1 | 2/2006 | Etemad et al. |
| 2006/0072540 A1* | 4/2006 | Grimbergen ........... H04J 3/1611 370/351 |

(Continued)

FOREIGN PATENT DOCUMENTS

| | | |
|---|---|---|
| CN | 101013340 A | 8/2007 |
| WO | 2009/062185 A2 | 5/2009 |

OTHER PUBLICATIONS

Chinese communication, with English translation, dated Oct. 26, 2015 in corresponding Chinese patent application No. 201180052007.2.

(Continued)

*Primary Examiner* — Robert M Morlan
(74) *Attorney, Agent, or Firm* — Nields, Lemack & Frame, LLC

(57) ABSTRACT

Various techniques for reducing power in a wireless network device are disclosed. In some embodiments, software routines within the device are modified to minimize the time during which the analog circuitry in a radio is powered. In some embodiments, the techniques make use of knowledge of implied delays associated with a particular network protocol. For example, in a CSMA network, there is a defined minimum period before the device can attempt to gain access to the media. The radio may be powered off during this defined period. In other embodiments, modifications to a protocol are disclosed which allow additional power savings.

13 Claims, 4 Drawing Sheets

(56) References Cited

U.S. PATENT DOCUMENTS

| | | |
|---|---|---|
| 2007/0064701 A1 | 3/2007 | Lin et al. |
| 2008/0170552 A1 | 7/2008 | Zaks |
| 2009/0046789 A1 | 2/2009 | Xu et al. |
| 2010/0061272 A1 | 3/2010 | Veillette |
| 2011/0090844 A1 | 4/2011 | Gong et al. |
| 2012/0008626 A1* | 1/2012 | Brederveld .......... G06Q 10/087 370/392 |
| 2012/0106417 A1 | 5/2012 | Spero et al. |

OTHER PUBLICATIONS

International Search Report/Written Opinion mailed Apr. 10, 2012 in corresponding PCT application No. PCT/US2011/057807.

IEEE Computer Society, IEEE Std. 802.15.4-2006, Sep. 8, 2006, pp. 1-305, "Part 15.4: Wireless Medium Access Control (MAC) and Physical Layer (PHY) Specifications for Low-Rate Wireless Personal Area Networks (WPANs)", 323 pages.

Office Action—Restriction—mailed Apr. 3, 2014 in corresponding U.S. Appl. No. 13/279,402.

Office Action mailed Jul. 3, 2014 in corresponding U.S. Appl. No. 13/279,402.

Final Rejection mailed Feb. 10, 2015 in corresponding U.S. Appl. No. 13/279,402.

Notice of Allowance mailed Mar. 17, 2015 in corresponding U.S. Appl. No. 13/279,402.

\* cited by examiner

REDUCED POWER CONSUMPTION IN A WIRELESS NETWORK DEVICE

This application is a divisional of U.S. patent application Ser. No. 13/279,402 filed Oct. 24, 2011, which claims priority to U.S. Provisional Application Ser. No. 61/407,131, filed Oct. 27, 2010, the disclosures of which are incorporated herein by reference in their entireties.

BACKGROUND

The explosion in the number of wireless devices and protocols has enabled applications never thought possible. By eliminating the need to be physically connected to a device, such as a sensor or actuator, wireless systems can remotely monitor and control various operations. This enables new applications, such as a remotely-controlled and monitored motion detection system, temperature control system, and other uses.

Various protocols have been proposed and used to take advantage of these new uses for wireless devices. Protocols, such as Bluetooth, WiFi, and Zigbee®, all define formats and standards for various devices.

One important consideration and enabler for the future growth and use of these wireless devices is their power consumption. In some applications, it would be beneficial, or perhaps even essential, that the device be battery powered.

Therefore, any techniques which can be used to lower power consumption in a wireless network device would be advantageous.

SUMMARY

Various techniques for reducing power in a wireless network device are disclosed. In some embodiments, software routines within the device are modified to minimize the time during which the analog circuitry in a radio is powered. In some embodiments, the techniques make use of knowledge of implied delays associated with a particular network protocol. For example, in a CSMA network, there is a defined minimum period before the device can attempt to gain access to the media. The radio may be powered off during this defined period. In other embodiments, modifications to a protocol are disclosed which allow additional power savings.

DETAILED DESCRIPTION

Figure 1:
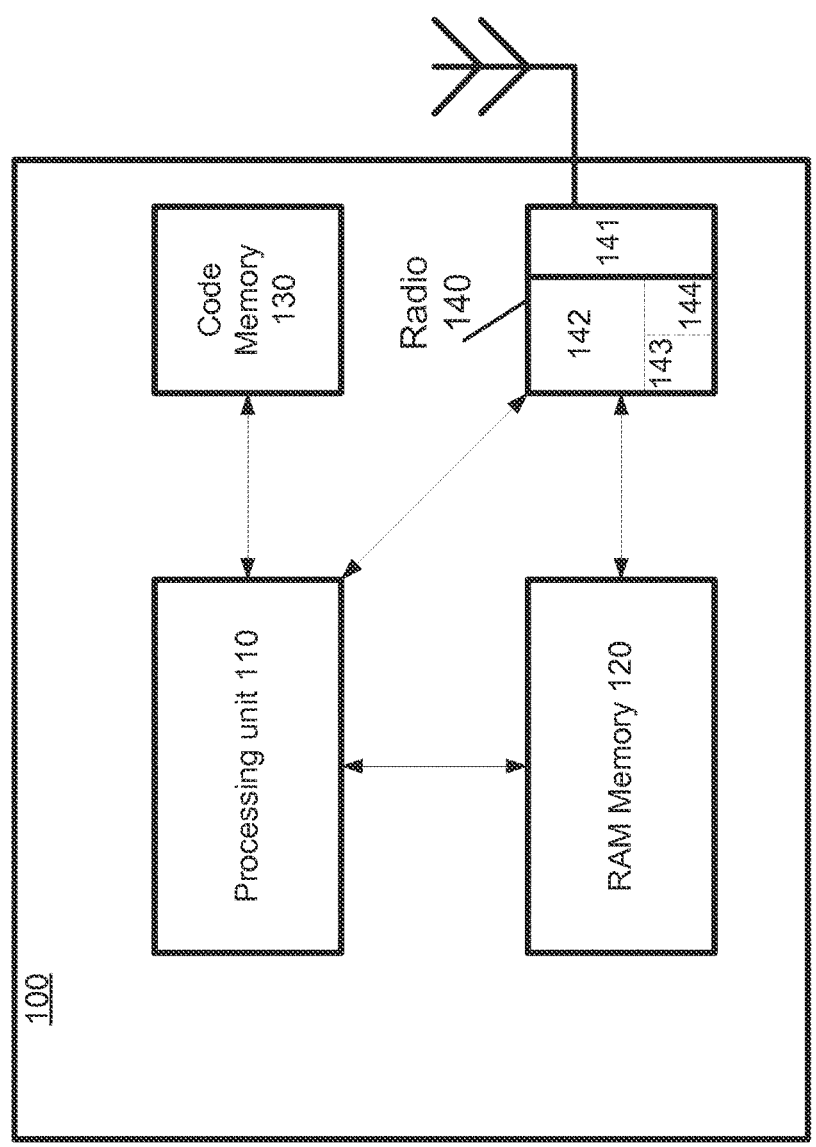
FIG. 1 is a representative schematic showing various hardware components of a wireless network device.

FIG. 1 shows a representative schematic of a wireless network device, including selected hardware components. In some embodiments, the hardware components may include a system-on-chip (SOC) device 100, having a processing unit 110, code memory 130, RAM 120, interrupt controller (not shown), peripherals (not shown), and a radio 140. The radio component 140 includes analog circuitry 141, such as amplifiers, oscillators and other components. The radio component 140 also includes digital circuitry 142, including a baseband processor 143 and Medium Access Controller (MAC) 144. The term "radio component" is used to denote the combination of the analog circuitry 141 and digital circuitry 142. The radio component 140 may be powered by a separate power supply, such that it can be powered-off while portions of the SOC remain powered. In some embodiments, the power to the radio component 140 may be separated, such that power may be separately supplied to the digital circuitry 142, which is typically low power, and the analog circuitry 141, which typically consumes larger amounts of power. In some embodiments, only the analog circuitry 141 is powered by a separate power supply, while the digital circuitry 142 is powered by the same power supply as the rest of the SOC 100. In other embodiments, the SOC 100 is configured such that the baseband process 143 and analog circuitry 141 may be turned off while the rest of the radio component 140 remains powered. By separating the power used by the radio component 140, particularly the power used by the analog circuitry 141, from the rest of the device 100, this lowers overall system power. It also allows the processor 110 to remain active, even when the radio is powered-off.

Throughout this disclosure, the concept that the "radio" can be turned off to conserve power is described. In some embodiments, this means that only the analog circuitry 141 is turned off, while the rest of the radio component 140 remains powered. In other embodiments, both the analog circuitry 141 and the baseband processor 143 are turned off, while the MAC 144 remains powered. In yet other embodiments, the entire radio 140 component may be powered off. Thus, the phrase "the radio is turned off" as used this disclosure includes any configuration in which at least a portion of the radio component 140 is turned off during normal operation of the SOC 100. The disclosure is not meant to be limited to only one particular subset of the radio component that is turned off, rather any subset of the radio component may be powered off. In the preferred embodiment, at least the analog circuitry 141 is powered off, as this is typically the highest power consumption part of the radio component 140.

As shown in FIG. 1, the processing unit 110 receives instructions from code memory 130. These instructions allow the processing unit 110 to execute the functions required by the device and associated wireless protocol. The processing unit 110 also is able to load information from and store information to both the RAM memory 120 and the radio component 140. For example, configuration information may be stored from the processing unit 110 to the radio component 140. Data which is received and transmitted by the radio component 140 is typically stored in the RAM memory 120. The code memory 130 also contains software capable of performing the functions described herein. The software may be written in any suitable programming language and the choice is not limited by this disclosure. Additionally, all applications and software described herein are computer executable instructions that are contained on a computer-readable media. For example, the software and applications may be stored in a read only memory, a rewritable memory, or within an embedded processing unit. The particular type of processing unit 110 on which this software executes is application dependent and not limited by the present invention.

Figure 2:
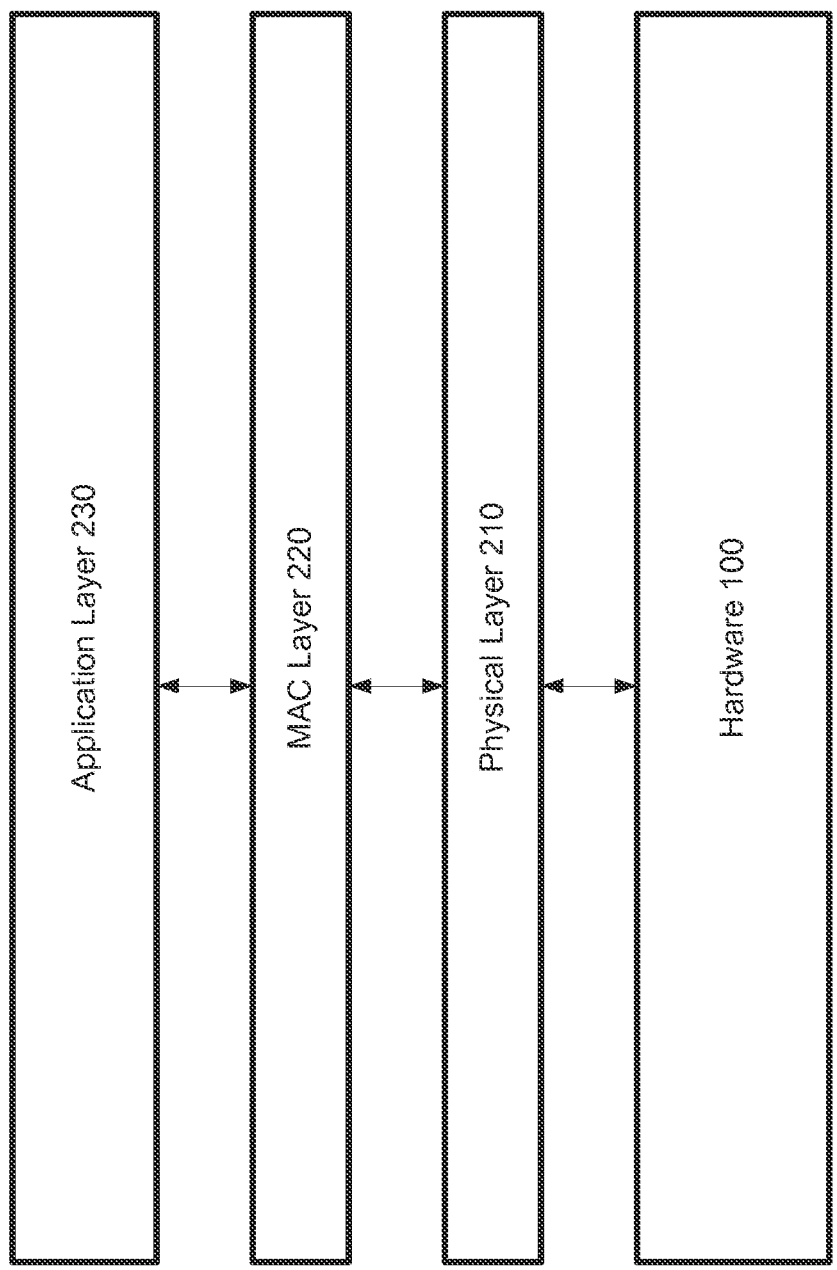
FIG. 2 is a representative schematic showing the interaction between various software components and the hardware components of a wireless network device.

FIG. 2 shows the interaction between the various software components and the hardware. The software may include various layers, such as a physical layer 210, a MAC layer 220, and an application layer 230. Typically, the physical layer 210 is responsible for configuration of the radio 140, and actual manipulation of the radio hardware. The MAC layer 220 receives information, typically in the form of packets from the physical layer 210. It then parses the contents of these packets. In response, the MAC layer 220 may send data to the physical layer 210 for transmission by the radio 140. In some embodiments, the MAC layer may also determine when the radio hardware should be powered or turned off, based on timers or the contents of the received packets. In some embodiments, the MAC layer 220 is partially implemented in hardware and partially in software. In this embodiment, the application layer 230 submits a transmission to the software MAC. The software MAC then configures the hardware MAC to transmit. The hardware MAC then controls the hardware layer 210 which controls the hardware baseband which controls the analog circuitry.

In a wireless network device, the radio component 140, and especially the analog circuitry 141, may be a large contributor to power consumption. Therefore, any technique which reduces the use of the radio, and can therefore disable it, can significantly improve battery life. At any given time, the analog circuitry 141 in the radio 140 can either be in receive mode, be actively transmitting, or be powered-off. The term "power-on the radio" is synonymous with "put the radio into receive mode", which requires powering the analog circuitry 141. In some embodiments, a portion of the digital circuitry 142 in the radio 140 may be powered, even when the radio is said to be powered-off. In other embodiments, the MAC 144 may be powered, while the baseband processor 143 and analog circuitry 141 are powered off. In other embodiments, all of the digital circuitry 142 may be powered while the analog circuitry 141 is powered off. Thus, when the radio is turned off, at least a portion of the radio component 140 is powered off, so as to reduce power consumption.

According to one method, the use of the radio during initialization may be reduced. For example, when the SOC 100 is reset or wakes up from its lowest power deep sleep state, the radio component 140 may need to be initialized before it can be used.

Typically, the radio component 140 is powered-on and then all initializations are performed. These initializations may include configuration of the radio for communication on a certain frequency (channel), calibration of radio parameters for optimal function on the selected channel, configuration of special radio operating modes (external power amplifier, high-power mode, etc.). Many of these functions are performed using only the digital circuitry 142 of the radio component 140.

In some embodiments of the radio component, the only one of these operations that actually requires the analog circuitry 141 of the radio component 140 to be powered is the calibration of radio parameters. While this disclosure refers to analog circuitry, it is understood that the purpose is to disable the circuitry used to transmit and receive packets, as this circuitry typically consumes more power than other portions of the device.

Thus, in one embodiment, the analog circuitry 141 of the radio component 140 is left powered-off until all of the other initialization steps (except calibration of radio parameters) are completed. At this point, the software determines whether a calibration of radio parameters is required. Various criteria may be used to determine whether calibration is required, such as time since last calibration, the difference between the current temperature and previous calibration temperature, and whether calibration has ever been performed. In the event that these criteria suggest that a calibration is required, the software turns the analog circuitry 141 of the radio component 140 on and performs the required calibrations. In the event that calibration is not required, the calibration sequence is bypassed, and the radio 141 is powered-on for actual communication.

Other optimizations of power consumption may be done based on a detailed understanding of the underlying network protocol. For example, in one embodiment, the details of the low-level communications protocol are specified by the 802.15.4 standard. Like many other multi-node communications protocols, collision avoidance is essential.

It should be understood that many of the scenarios described herein exist in other wireless protocols and the techniques described herein are equally applicable to those protocols. The use of the 802.15.4 is illustrative and is not meant to limit the scope of the invention to this embodiment.

To avoid contention, devices wanting to transmit a packet must first check to see that the channel (i.e. the air in a wireless device) is available by following a procedure, known as Carrier Sense Multiple Access—Collision Avoidance (CSMA-CA, or simply CSMA). CSMA requires the device first wait a random period of time, then perform a check for a clear channel, known as Clear Channel Assessment (CCA), before transmitting. If the channel is not available, the device waits again, using another longer delay cycle. Up to 4 total CCA attempts, each with a randomized delay preceding it, are made to get clear air.

After gaining access to the channel after a successful CCA, the device transmits the packet. Following the transmission, the device listens for an acknowledge packet (ACK) from the intended recipient of the packet. If the ACK is not received within a defined time period, the transmit attempt is considered failed and the entire process is started over again. Up to 4 total attempts are made to get an acknowledge packet.

In some hardware embodiments, MAC hardware 144, within the SOC 100, manages some of the transitions between the receive and transmit states of the analog circuitry 141 in radio component 140 automatically. For example, if the radio 141 is powered-on and the CCA check succeeds, MAC hardware 144 may automatically put the radio 141 into transmit mode to send the packet. At the end of the packet transmission, the MAC hardware 144 may automatically put the radio 141 into receive mode to listen for the ACK. In some embodiments, MAC hardware 144 cannot control the power provided to the analog circuitry 141 of the radio component 140, as this must be done by the software.

In most instances, the analog circuitry 141 of the radio 140 is powered-on during this CSMA process, using valuable power while not receiving or transmitting packets. In one embodiment, the software of the present invention powers-off the radio 141 during the delay cycles associated with CSMA. Once the delay timer has expired, the software then turns the radio 141 on, so that it can perform the CCA check and transmit the packet, if the CCA check was successful. If the CCA check fails, the software powers-off the radio 141 again, and waits until the next random delay timer expires before powering on the radio 141 again. This technique significantly reduces the overall power consumption of the radio component 140, with no adverse effect on the device's performance.

In some hardware embodiments, the digital circuitry 142 in the radio component 140 may contain a dedicated hardware timer that is used to schedule the CCA check and optional packet transmission without further software interaction. Some of these hardware embodiments will not have the ability to automatically power-on the radio 141 to perform the CCA check. According to another embodiment of the software, the present invention utilizes knowledge of this hardware behavior in order to continue to use the dedicated hardware timer instead of a separate general purpose timer peripheral. Knowing that the CCA check for any transmit attempt will necessarily fail in the scenario just described (due to the radio 141 being powered-off), the software responds to the CCA fail event by powering-up the radio 141 and initiating another hardware-controlled transmit attempt with the minimum delay required to perform a CCA check. If the CCA check still fails, the software powers-off the radio 141, and initiates another hardware-controlled transmit attempt using the next random delay according to CSMA. If the CCA check is successful, the radio component 140 automatically transmits the packet.

Figure 5:
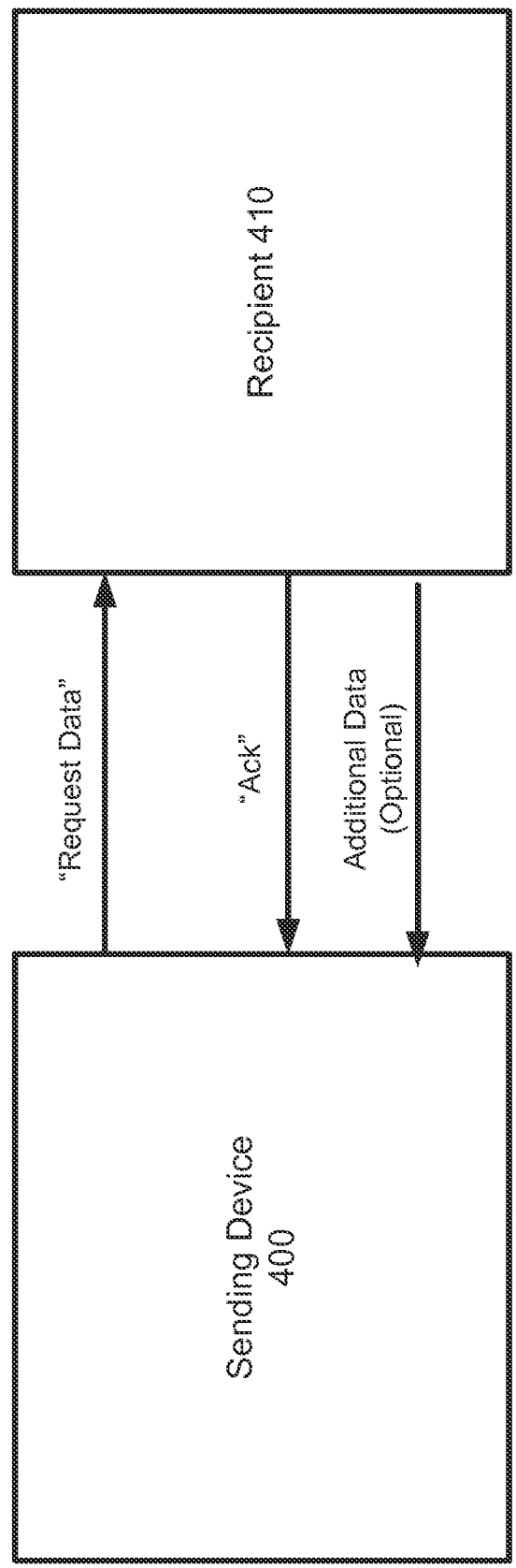
FIG. 5 shows two devices communicating according to one embodiment.

According to another method, the present invention utilizes specific knowledge about the wireless protocol to conserve power. For example, in the 802.15.4 standard, as shown in FIG. 5, a device 400 may transmit a "Data Request" packet. In response to this packet, the recipient 410 will return an acknowledgement (ACK) packet to the sending device 400. The incoming ACK will inform the sending device 400 whether the recipient 410 has data that it wishes to transmit to the sending device 400.

Figure 3:
FIG. 3 shows the format of a particular message according to one protocol.

FIG. 3 shows the format of an ACK packet 300 in accordance with the 802.15.4 standard. The first two bytes comprise a Frame Control field 310. The third byte comprises a sequence number 320, and the remaining two bytes comprise a cyclic redundancy code 330. The ACK packet 300 is always five bytes long.

Figure 4:
FIG. 4 shows the format of a particular field in the message shown in FIG. 3.

FIG. 4 further describes the Frame Control field 310. Of interest is bit 4 (Frame pending) 311. Frame pending 311 informs the sending device (i.e. the one receiving the ACK 300) that the recipient has data that it wishes to transmit to the sending device after the ACK is completed.

Typically, after the ACK 300 is received, the physical layer 210 informs the MAC layer 220. The MAC layer 220 then performs checks on the packet, including integrity, sequence number, etc. If the MAC layer 220 verifies the ACK 300, and determines that no data is forthcoming (i.e. the Frame pending bit 311 is not set), it will power-off the radio 141. The software and processing time to perform these tests is not trivial and consumes power.

In one embodiment, the software in the physical layer 210 is modified to check each byte of the ACK 300 as they arrive at the device. As soon as the second byte of the ACK 300 is received, and the physical layer 210 determines that the Frame pending bit 311 is not set, it immediately powers-off the radio 141. In other words, it does not wait to receive the remaining bytes of the ACK packet 300. This technique saves not only the time required to receive the three additional bytes, but also the processing time required for the MAC layer 220 to validate the ACK 300.

It should be noted that there is a chance that there is an error in the Frame pending bit 311, due to a transmission error. In this case, the physical layer 210 may have incorrectly determined that the recipient did not have data to transmit and powered-off the radio 141. While this behavior is not ideal, it is acceptable, as the sending device transmits "Data Request" packets at regular intervals.

In some software embodiments, if the MAC layer 220 receives an ACK 300 with a transmission error, or does not receive an ACK 300, it initiates a retransmission of the "Data Request" packet. In order to avoid this behavior, the physical layer 210 may construct a "fake" or artificial ACK packet that is valid in accordance with the protocol. This "fake" or artificial ACK packet is required since the physical layer 310 powered-off the radio 141 before receiving the entire ACK 300 from the recipient. Construction of a valid "fake" ACK allows the MAC layer 220 to continue without retrying the "data Request" packet. Thus, the MAC layer 220 is deceived into believing that an ACK was properly received. In other embodiments, the MAC layer 220 may be modified to ignore unsuccessful ACKs on "Data Request" packets. In other embodiments, the "fake" ACK may be communicated from the physical layer 210 to the MAC layer 220 via an interrupt, status bit, or other general signal rather than through the construction of an actual packet representation in RAM.

Note that while a specific instance regarding ACK packets 300 was described above, the same method may be employed in other scenarios. For example, using the same method, the receiving device may parse a packet as it is being received, and upon obtaining the data of interest, immediately powers off the radio. This data of interest may include, but is not limited to:
  whether more data is coming,
  acknowledgement that previously sent data was received,
  confirmation that a device is active,
  whether the incoming packet is intended for this device (in which case, the radio is turned off after a non-matching device address is seen and turned back on after the expected end of the packet),
  whether the incoming packet is intended for this network (again, in this case, the radio is turned off after a non-matching network identifier or PAN ID is seen and turned back on after the expected end of the packet), or
  whether there are errors in the incoming packet (in which case, the radio is turned off after the baseband reports an unrecoverable error in one of the received bytes or symbols and is turned back on after the expected end of the packet).

If the ACK 300 was transmitted with the Frame pending bit 311 set, this signifies that the recipient 410 will be transmitting additional data to the sending device. In some embodiments, the recipient 410 needs to gain access to the channel by following the CSMA process. This process guarantees that a minimum amount of time must necessarily elapse from the end of the ACK packet 300 to the start of the data transmission. To conserve power, the software (preferably the physical layer 210) may power-off the radio 141 for this minimum amount of time, knowing that the additional data will not be sent during this window.

According to another method, the recipient 410 informs the sending device 400 of the delay value that it will be using during the upcoming CSMA process. Returning to FIG. 4, note that the Frame control bytes 310 contain reserved bits in bit positions 7-9 and 12-13. These five bits, or a subset of these bits, may be used to convey delay information to the sending device. For example, in 802.15.4, the delay used during the CSMA process is a multiple of a fixed delay period. In other words, the device may wait 1 delay period, 2 delay periods, etc, where the duration of the delay period is predetermined. In this embodiment, the recipient 410 transmits the number of delay periods that it will be using during the next CSMA process to the sending device 400. In this way, the sending device 400 is aware of the minimum delay that will transpire before the recipient 410 can gain access to the channel. Therefore, the sending device 400 may power-off the radio 141 until this minimum time has elapsed.

In another embodiment, the delay used during the CSMA process is not a multiple of a fixed delay time. In this embodiment, there may be more possible delay times than can be expressed using the reserved bits in Frame Control field 310. In this case, the recipient may use those reserve bits to indicate the percentage of the maximum delay that it will be waiting before attempting to gain access to the channel. For example, if the maximum delay time is 8 milliseconds, the recipient 410 can use three bits to inform the sending device 400 of the approximate delay value that it will use. The following table shows one possible embodiment using 3 bits and a 8 millisecond delay time.

| Bits | Delay time |
| --- | --- |
| 000 | Less than 1 millisecond; leave radio on |
| 001 | More than 1 millisecond, but less than 2 millisecond; radio can be powered-off for 1 millisecond |
| 010 | More than 2 milliseconds, but less than 3 millisecond; radio can be powered-off for 2 milliseconds |
| 011 | More than 3 milliseconds, but less than 4 millisecond; radio can be powered-off for 3 milliseconds |
| 100 | More than 4 milliseconds, but less than 5 millisecond; radio can be powered-off for 4 milliseconds |
| 101 | More than 5 milliseconds, but less than 6 millisecond; radio can be powered-off for 5 milliseconds |
| 110 | More than 6 milliseconds, but less than 7 millisecond; radio can be powered-off for 6 milliseconds |
| 111 | More than 7 milliseconds; radio can be powered-off for 7 milliseconds |

In another embodiment, there may be a minimum time before the recipient 410 can access the channel, as well as a maximum time. In this embodiment, the bits may be used to represent the percentage of time between the minimum and maximum times that the recipient 410 will wait. For example, assume a minimum delay of 1 millisecond and a maximum delay of 9 milliseconds. The three bits may be used as follows:

$$\text{Expected Delay} = \text{Min\_Delay} + ((\text{bit\_value})/8) * (\text{Max\_Delay} - \text{Min\_Delay})$$

The following chart shows the delay times using this method:

| Bits | Delay time (= 1 ms + (bit value/8) * 8 ms) |
| --- | --- |
| 000 | More than 1 millisecond, but less than 2 millisecond; radio can be powered-off for 1 millisecond |
| 001 | More than 2 milliseconds, but less than 3 millisecond; radio can be powered-off for 2 milliseconds |
| 010 | More than 3 milliseconds, but less than 4 millisecond; radio can be powered-off for 3 milliseconds |
| 011 | More than 4 milliseconds, but less than 5 millisecond; radio can be powered-off for 4 milliseconds |
| 100 | More than 5 milliseconds, but less than 6 millisecond; radio can be powered-off for 5 milliseconds |
| 101 | More than 6 milliseconds, but less than 7 millisecond; radio can be powered-off for 6 milliseconds |
| 110 | More than 7 milliseconds; radio can be powered-off for 7 milliseconds |
| 111 | More than 8 milliseconds; radio can be powered-off for 8 milliseconds |

This embodiment may require a modification to one or more protocol standards to be implemented. In other embodiments, the reserved bits are used as vendor unique bits, wherein all devices need not implement this modification. In this case, the value 000 may be used to represent that the radio 141 cannot be turned off.

While the above modifications associated with power savings during receipt of an ACK 300 are described as software modifications, the invention is not limited to this embodiment. For example, the SoC 100 may be modified to automatically perform the check of the Frame pending bit 311 in the ACK packet 300, as described above. In response to determining that this bit is set, the hardware may perform some or all of the functions described above.

In another embodiment, the hardware may automatically parse the reserved bits in the ACK packet 300 to determine the delay that will be used by the recipient 410. Once the delay has been determined, the hardware may automatically power-off the radio 141 and power-on the radio 141 at the appropriate times.

Furthermore, the setting of the reserved bits in the ACK packet 300 by the recipient 410 may be done either by software or by hardware.

According to another method, the radio usage can be minimized by delaying the powering of the radio 141 until a packet is ready for transmission. In most embodiments, outgoing packets are constructed by having each software layer add a "wrapper", or additional information to the packet after receiving it from a higher software layer. For example, the application layer 230 may construct a packet, which it passes to the MAC layer 220. The MAC layer 220 then adds additional information to the packet, and passes it to the physical layer 210.

In most radio implementations, the radio 141 remains powered-off or in a reduced power state, when there are no packets to transmit. However, once a packet is passed to the MAC layer 220, the MAC layer 220 typically powers-on the radio 141 in anticipation of the transmission of the packet. However, the MAC layer 220 still has to perform some packet construction, such as adding encryption, preparing the packet for DMA, and other features. This packet construction may be time consuming, thereby using valuable power for the radio 141 unnecessarily. In this embodiment, the MAC layer 220 may power-on the radio 141 as it passes the packet to the physical layer 210. In another embodiment, the physical layer 210 may be responsible for powering on the radio 141 upon receipt of the packet from the MAC layer 220.

While the above description is related to wireless transmission, the same methods and algorithms may be employed in wired networks. In any network, the circuitry used to receive and transmit is typically consumes more power than other portions of the device. Thus, these methods can be used to power off the circuitry used to receive and transmit packets using any media.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for reducing power consumption in a device, said device comprising circuitry for transmitting and receiving packets, and a processing unit, said method comprising:
   sending a data request packet from said device to a second device;
   receiving an acknowledgement packet from said second device in response to said data request packet, said acknowledgement packet having an indication regarding whether additional data will be transmitted by said second device;
   parsing said acknowledgement packet, using said processing unit, as said acknowledgement packet is received;
   disabling said circuitry upon receipt of said indication before receipt of entire acknowledgement packet, if said indication denotes that additional data will not be transmitted by said second device; and
   disabling said circuitry for a predetermined time period after receipt of said acknowledgement packet, if said indication denotes that additional data will be transmitted by said second device, wherein said acknowledgement packet further comprises an indication of a minimum time before said second device transmits said additional data, and said predetermined time period is determined based on said indication of the minimum time.

2. The method of claim 1, wherein said indication comprises a frame pending bit.

3. The method of claim 1, wherein said packets are transmitted utilizing a network protocol and wherein said predetermined time period comprises time needed for said second device to gain access to a communication channel based on said network protocol.

4. The method of claim 1, wherein said indication of said minimum time comprises a plurality of bits, said plurality of bits representing a multiple of a fixed delay period.

5. The method of claim 1, wherein said indication of said minimum time comprises a plurality of bits, said plurality of bits representing a percentage of a maximum delay.

6. The method of claim 1, wherein said indication of said minimum time comprises a plurality of bits, said plurality of bits representing a percentage of time between a minimum and a maximum delay.

7. The method of claim 1, wherein said disabling is performed by said processing unit.

8. A method for reducing power consumption in a device, said device comprising circuitry for transmitting and receiving packets, and a processing unit, said method comprising:
   receiving a first packet from a second device;
   parsing said first packet, using said processing unit;
   determining, from data in said first packet, that a second packet will be transmitted by said second device; and
   disabling said circuitry for a period of time, said period of time being less than a minimum time before which said second device will transmit said second packet, wherein said first packet comprises an indication of said minimum time.

9. The method of claim 8, wherein said first packet and said second packet are transmitted utilizing a network protocol, and said minimum time is determined based on said protocol.

10. The method of claim 8, wherein said indication comprises a plurality of bits, said plurality of bits representing a multiple of a fixed delay period.

11. The method of claim 8, wherein said indication comprises a plurality of bits, said plurality of bits representing a percentage of a maximum delay.

12. The method of claim 8, wherein said indication comprises a plurality of bits, said plurality of bits representing a percentage of time between a minimum and a maximum delay.

13. The method of claim 8 wherein said disabling is performed by said processing unit.

\* \* \* \* \*